United States Patent
Song et al.

(10) Patent No.: US 11,196,108 B2
(45) Date of Patent: Dec. 7, 2021

(54) BATTERY MODULE HEAT MANAGEMENT ASSEMBLY, BATTERY PACK AND VEHICLE

(71) Applicant: CONTEMPORARY AMPEREX TECHNOLOGY CO., LIMITED, Ningde (CN)

(72) Inventors: Yi Song, Ningde (CN); Yanhuo Xiang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 104 days.

(21) Appl. No.: 16/850,476

(22) Filed: Apr. 16, 2020

(65) Prior Publication Data
US 2020/0243932 A1 Jul. 30, 2020

Related U.S. Application Data

(63) Continuation of application No. 15/880,348, filed on Jan. 25, 2018, now Pat. No. 10,658,715, which is a
(Continued)

(51) Int. Cl.
| | |
|---|---|
| *H01M 10/6551* | (2014.01) |
| *H01M 10/658* | (2014.01) |
| *H01M 10/617* | (2014.01) |
| *H01M 10/657* | (2014.01) |
| *H01M 10/6552* | (2014.01) |
| *H01M 10/647* | (2014.01) |

(Continued)

(52) U.S. Cl.
CPC ..... *H01M 10/6551* (2015.04); *H01M 10/486* (2013.01); *H01M 10/617* (2015.04); *H01M 10/647* (2015.04); *H01M 10/657* (2015.04); *H01M 10/658* (2015.04); *H01M 10/6552* (2015.04); *H01M 10/6556* (2015.04); *H01M 10/6568* (2015.04); *H01M 50/20* (2021.01)

(58) Field of Classification Search
CPC .......... H01M 10/613; H01M 10/6556; H01M 10/6568; H01M 10/6557; H01M 10/6567
See application file for complete search history.

(56) References Cited

U.S. PATENT DOCUMENTS

| | | | |
|---|---|---|---|
| 6,255,015 B1 * | 7/2001 | Corrigan ............ | H01M 50/528 429/149 |
| 2005/0255379 A1 * | 11/2005 | Marchio .............. | H01M 50/116 429/153 |

(Continued)

FOREIGN PATENT DOCUMENTS

CN 101862930 A * 10/2010

*Primary Examiner* — Imran Akram
(74) *Attorney, Agent, or Firm* — Morgan, Lewis & Bockius LLP

(57) ABSTRACT

The present disclosure provides a battery module heat management assembly, a battery pack and a vehicle. The battery module heat management assembly includes a cooling mechanism. The cooling mechanism includes: a plurality of multi-channel pipes configured to be provided at a bottom of a battery module; a first fluid collector and a second fluid collector configured to be communicated with an external cooling fluid circuit, two ends of each multi-channel pipe are respectively communicated with the first fluid collector and the second fluid collector.

19 Claims, 5 Drawing Sheets

Related U.S. Application Data continuation of application No. PCT/CN2015/085177, filed on Jul. 27, 2015.

(51) Int. Cl.
*H01M 10/6556* (2014.01)
*H01M 10/6568* (2014.01)
*H01M 10/48* (2006.01)
*H01M 2/10* (2006.01)
*H01M 50/20* (2021.01)

(56) References Cited

U.S. PATENT DOCUMENTS

| | | | |
|---|---|---|---|
| 2008/0318118 A1* | 12/2008 | Ghosh | H01M 50/213 429/88 |
| 2009/0140515 A1* | 6/2009 | Ichimura | F16L 39/00 285/124.5 |
| 2009/0305124 A1* | 12/2009 | Ahn | H01M 10/659 429/120 |
| 2011/0198335 A1* | 8/2011 | Lin | H01M 10/647 219/209 |
| 2012/0121959 A1* | 5/2012 | Yamada | B60K 1/04 429/100 |
| 2012/0129030 A1* | 5/2012 | Lim | H01M 10/6556 429/120 |
| 2012/0148889 A1* | 6/2012 | Fuhr | H01M 10/6567 429/87 |
| 2013/0034767 A1* | 2/2013 | Pentapati | F28F 9/026 429/120 |
| 2013/0149575 A1* | 6/2013 | Gebbie | H01M 10/617 429/72 |
| 2013/0266838 A1* | 10/2013 | Von Borck | B21D 53/06 429/120 |
| 2015/0090427 A1* | 4/2015 | Brandauer | H01M 10/6556 165/64 |
| 2015/0093613 A1* | 4/2015 | Obasih | H01M 10/647 429/82 |
| 2015/0099146 A1* | 4/2015 | Kim | H01M 10/625 429/53 |
| 2015/0140388 A1* | 5/2015 | Harada | H01M 10/617 429/120 |
| 2015/0200429 A1* | 7/2015 | Lee | F28D 1/0478 429/120 |
| 2015/0214521 A1* | 7/2015 | Hisano | H01M 10/625 429/99 |
| 2016/0064783 A1* | 3/2016 | Chorian | H01M 10/6551 429/72 |
| 2016/0172727 A1* | 6/2016 | Chan | H01M 50/20 429/120 |
| 2016/0372804 A1* | 12/2016 | Koch | H01M 10/6555 |
| 2017/0012330 A1* | 1/2017 | Kim | H01M 10/625 |
| 2018/0241102 A1* | 8/2018 | Kim | H01M 10/6568 |

* cited by examiner

BATTERY MODULE HEAT MANAGEMENT ASSEMBLY, BATTERY PACK AND VEHICLE

CROSS-REFERENCE TO RELATED APPLICATIONS

The present application is a continuation of U.S. patent application Ser. No. 15/880,348, filed on Jan. 25, 2018, entitled "BATTERY MODULE HEAT MANAGEMENT ASSEMBLY", which is a continuation of PCT Application No. PCT/CN2015/085177, filed on Jul. 27, 2015, all of which are hereby incorporated by reference in their entirety.

FIELD

The present disclosure relates to a field of battery, and particularly relates to a battery module heat management assembly, a battery pack and a vehicle.

BACKGROUND

With gradual improvement of the electric vehicle technology and the power battery technology, the market has an increasing requires on the power battery module in energy density, power, cycle life, safety, etc. Developing a heat management unit and a heat management assembly satisfying the requirement of existing power battery module system becomes an essential project in development process of power battery system.

Regarding the battery management system, temperature and temperature consistency are basic indexes of assessing performance, life and safety of the power battery system, and also are important parameters of estimating state of charge (SOC) and control policy of the battery management system. However the working temperature range of the vehicle is from −30° C. to 80° C. and is far beyond the working temperature range of the power battery. Taking a specific type of a lithium-ion power battery for example, an optimal working temperature of the lithium-ion power battery ranges from 20° C. to 40° C. If the battery works at a temperature higher than 40° C. for a long time, the cycle life will be greatly reduced, and meanwhile the thermal runaway of the lithium-ion power battery will be caused at the high temperature; if the lithium-ion power battery works at a temperature lower than 0° C., besides potential security hazard possibly caused by charging at a low temperature, the lower output power and functional degradation cannot satisfy the demands of the normal working of the vehicle.

Therefore, the power battery system generally uses a heat management assembly and a thermal management module provided outside the batteries to heat and cool the batteries so as to rapidly adjust the temperature of the battery module to an appropriate working temperature range.

At present, the popular solutions of electric vehicle at domestic and oversea use an air blower system or a water cooling system to achieve the target for heat management of the battery module. Besides the air blower system is difficult to satisfy the requirements of waterproof level and dustproof level, the heat exchange efficiency of the air blower system is also lower, it is difficult to achieve the target of the temperature consistency of 5° C. required by the general lithium-ion battery, especially for the large lithium-ion battery pack. Although most of the battery packs using the water cooling system solution specially design a battery cooling plate at present, they are generally limited due to small size, heavy weight and higher manufacturing cost, and the solution using the foam and the thermal conductive pad to improve thermal transfer between the cooling plate and the battery module cannot resolve the life problem caused by the long term aging. In addition, the additional pipeline connections between the cooling plates in the battery pack not only occupy more design space and increase cost, but also bring security problem caused by leakage. In the cold winter, the function of heating rapidly at low temperature is more important. At present, most of the heating solutions of the battery pack have disadvantages such as low heating efficiency, uneven heating, bad reliability of the heating units and the like, and most of the heating solutions select to integrate the heating units in the battery module or separate the heating units from the cooling plate units, which also exist the problems of inconvenient maintenance and difficult installation and so on.

SUMMARY OF THE PRESENT DISCLOSURE

A battery module heat management assembly in accordance with some embodiments comprises a cooling mechanism. The cooling mechanism comprises: a plurality of multi-channel pipes configured to be provided at a bottom of a battery module; a first fluid collector and a second fluid collector configured to be communicated with an external cooling fluid circuit, two ends of each multi-channel pipe are respectively communicated with the first fluid collector and the second fluid collector.

Figure 1:
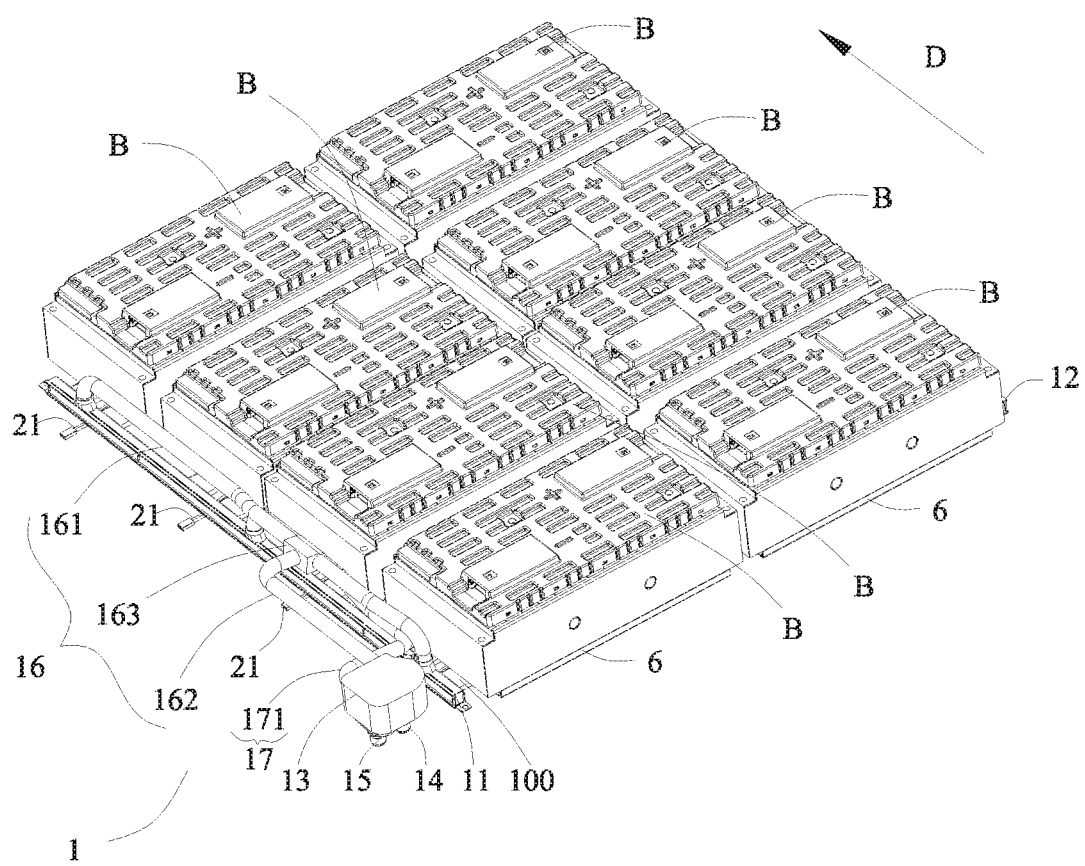
FIG. 1 is a perspective view of a battery module heat management assembly according to the present disclosure.

Reference numerals in figures are represented as follows:
1 cooling mechanism
  10 multi-channel pipe group
    100 multi-channel pipe
  11 first fluid collector
    110 port
  12 second fluid collector
  13 flange
  14 fluid inflow joint
  15 fluid outflow joint
  16 fluid inflow pipeline
    161 fluid inflow branch pipe
    162 fluid inflow main pipe
    163 multi-way inflow pipe
  17 fluid outflow pipeline 171 fluid outflow branch pipe
172 fluid outflow main pipe
173 multi-way outflow pipe
18 first partitioning plate
19 second partitioning plate
D arrangement direction
GP multi-channel pipe group pair
GM group module
TP multi-channel pipe pair
TM pipe module
2 heating film
  21 pluggable member
  22 extending portion
3 heat insulating layer
  31 heat insulating sub-layer
4 sealing gasket
5 temperature sensor
6 supporting structure
  61 leg portion
  62 opening portion
B battery module

DETAILED DESCRIPTION

Hereinafter a battery module heat management assembly according to the present disclosure will be described in detail in combination with the figures.

Referring to FIGS. 1-7, a battery module heat management assembly in accordance with some embodiments includes: a cooling mechanism 1, heating films 2 and heat insulating layers 3. The cooling mechanism 1 includes: a plurality of multi-channel pipe groups 10 arranged side by side, each multi-channel pipe group 10 has at least one multi-channel pipe 100, the number of the multi-channel pipe groups 10 is equal to the number of rows of battery modules B, each multi-channel pipe group 10 corresponds to one row of the rows of battery modules B, each of the rows of battery modules B has at least one battery module B, each multi-channel pipe group 10 contacts a bottom of one corresponding row of the rows of battery modules B from below; a first fluid collector 11 and a second fluid collector 12 communicated with an external cooling fluid circuit and respectively provided at two ends of the plurality of multi-channel pipe groups 10, two ends of each multi-channel pipe 100 of the plurality of multi-channel pipe groups 10 are respectively communicated with the first fluid collector 11 and the second fluid collector 12, so that the external cooling fluid circuit, the plurality of multi-channel pipe groups 10, the first fluid collector 11 and the second fluid collector 12 are communicated to cool all the rows of battery modules B. The heating film 2 is provided below one corresponding multi-channel pipe group 10 for heating the one corresponding multi-channel pipe group 10. The heat insulating layer 3 is provided below one corresponding heating film 2.

In the battery module heat management assembly according to the present disclosure, each multi-channel pipe group 10 contacts the bottom of one corresponding row of the rows of battery modules B from below, and the cooling fluid from outside flows through the first fluid collector 11, the multi-channel pipe groups 10 and the second fluid collector 12 to cool all the rows of battery modules B, which effectively promotes cooling efficiency of the battery modules B and ensures battery temperature consistency; the heating film 2 is provided below one corresponding multi-channel pipe group 10 for heating the one corresponding multi-channel pipe group 10 and in turn heating the corresponding battery module(s), and the heat insulating layer 3 is provided below one corresponding heating film 2, which reduces heat loss in heat transfer path, efficiently promotes heat efficiency of the battery module(s) and energy utilization ratio of the battery pack system; the heating film 2 is small in size and integrated below one corresponding multi-channel pipe group 10, so the structure of the battery pack is simplified and the space of the battery pack is saved.

In the battery module heat management assembly according to the present disclosure, each multi-channel pipe 100, the first fluid collector 11 and the second fluid collector 12 may be made of aluminum material and integrated by welding. The welding may be soldering.

In an embodiment of the battery module heat management assembly according to the present disclosure, referring to FIGS. 1-6, the cooling mechanism 1 further includes: a flange 13 provided to a battery pack box in a sealing mode, the battery pack box receives the rows of battery modules B; a fluid inflow joint 14 provided to the flange 13 for inflow of a cooling fluid supplied by the external cooling fluid circuit; a fluid outflow joint 15 provided to the flange 13 for outflow of the cooling fluid and returning the cooling fluid to the external cooling fluid circuit; a fluid inflow pipeline 16, one end of the fluid inflow pipeline 16 is fixed to the flange 13 and communicated with the fluid inflow joint 14, and the other end of the fluid inflow pipeline 16 is communicated with the first fluid collector 11; a fluid outflow pipeline 17, one end of the fluid outflow pipeline 17 is fixed to the flange 13 and communicated with the fluid outflow joint 15, and the other end of the fluid outflow pipeline 17 is communicated with the first fluid collector 11; and a first partitioning plate 18 inserted in the first fluid collector 11 for blocking communication between the fluid inflow pipeline 16 communicated with the first fluid collector 11 and the fluid outflow pipeline 17 communicated with the first fluid collector 11. Because the flange 13, the fluid inflow joint 14, the fluid outflow joint 15, the fluid inflow pipeline 16 and the fluid outflow pipeline 17 are connected with the first fluid collector 11, in other words, they may be positioned at a side of the first fluid collector 11, thereby saving space of the battery pack.

Figure 3:
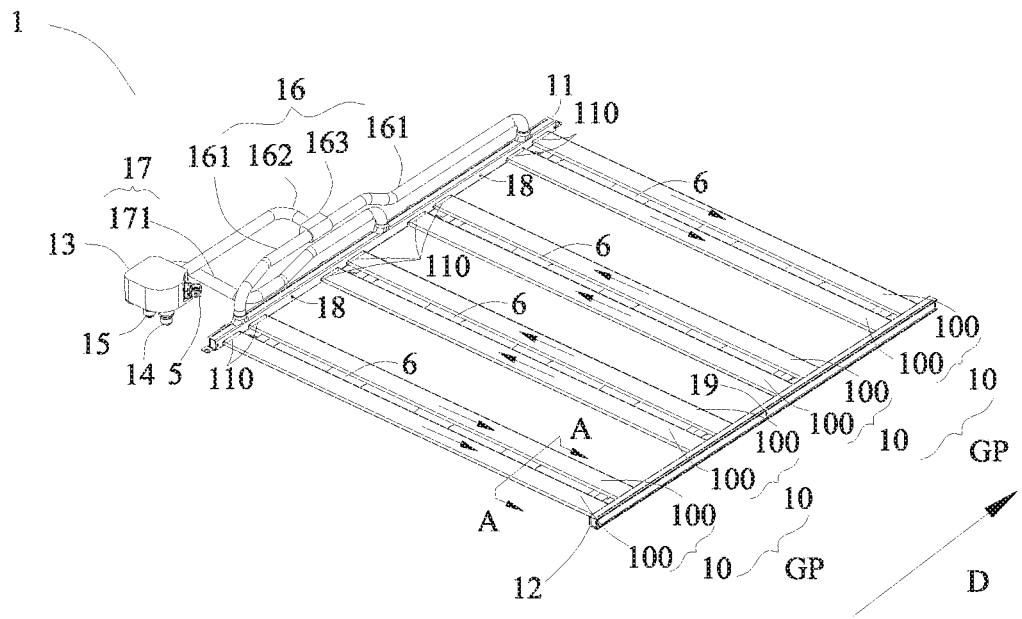
FIG. 3 is a perspective view of a cooling mechanism of the battery module heat management assembly according to the present disclosure, in which the number of multi-channel pipe groups is even.

In an embodiment of the battery module heat management assembly according to the present disclosure, referring to FIG. 3, the battery modules B of the battery pack are arranged in even rows; every two multi-channel pipe groups 10 in an arrangement direction D of the multi-channel pipe groups 10 form one multi-channel pipe group pair GP, each multi-channel pipe group 10 has at least one multi-channel pipe 100 which makes the fluid have the same flow direction in each multi-channel pipe group 10. The first fluid collector 11 have ports 110 corresponding to the plurality of multi-channel pipe groups 10, when the flow directions of the fluid of the plurality of multi-channel pipe groups 10 at the ports 110 in the arrangement direction D of the multi-channel pipe groups 10 are opposite, the first partitioning plate 18 inserted in the first fluid collector 11 is configured to block communication of two adjacent multi-channel pipe groups 10 which have the opposite flow directions. The cooling mechanism 1 of the battery module heat management assembly further includes second partitioning plates 19 inserted in the second fluid collector 12 and blocking communication of every two adjacent multi-channel pipe group pairs GP in the second fluid collector 12, and the two multi-channel pipe groups 10 of each multi-channel pipe group pair GP form one fluid circuit. The fluid inflow pipeline 16 includes a fluid inflow branch pipe 161, one end of the fluid inflow branch pipe 161 is communicated with each part of the first fluid collector 11 which is partitioned by the first partitioning plate 18 and used for inflow of the fluid. The fluid outflow pipeline 17 includes a fluid outflow branch pipe 171, one end of the fluid outflow branch pipe 171 is communicated with each part of the first fluid collector 11 which is partitioned by the first partitioning plate 18 and used for outflow of the fluid. When the fluid inflow branch pipe 161 is provided as one in number, the other end of the fluid inflow branch pipe 161 is fixed to the flange 13 and communicated with the fluid inflow joint 14. When the fluid inflow branch pipe 161 is provided as more than one in number, the fluid inflow pipeline 16 further includes: a fluid inflow main pipe 162, one end of the fluid inflow main pipe 162 is fixed to the flange 13 and communicated with the fluid inflow joint 14; and a multi-way inflow pipe 163 communicating the other end of the fluid inflow main pipe 162 and the other ends of all the fluid inflow branch pipes 161. When the fluid outflow branch pipe 171 is provided as one in number, the other end of the fluid outflow branch pipe 171 is fixed to the flange 13 and communicated with the fluid outflow joint 15. When the fluid outflow branch pipe 171 is provided as more than one in number, the fluid outflow pipeline 17 further includes: a fluid outflow main pipe 172, one end of the fluid outflow main pipe 172 is fixed to the flange 13 and communicated with the fluid outflow joint 15; and a multi-way outflow pipe 173 communicating the other end of the fluid outflow main pipe 172 and the other ends of all the fluid outflow branch pipes 171.

Figure 4:
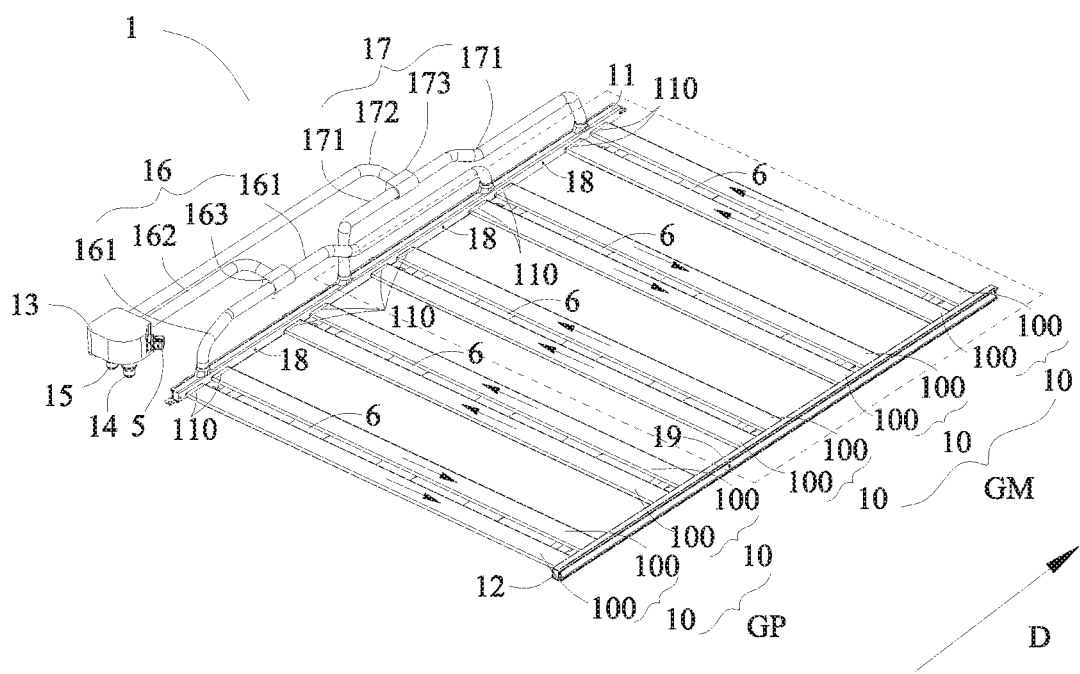
FIG. 4 is a perspective view of a cooling mechanism of the battery module heat management assembly according to the present disclosure, in which the number of multi-channel pipe groups is odd.

In an embodiment of the battery module heat management assembly according to the present disclosure, referring to FIG. 4, the battery modules B of the battery pack are arranged in odd rows and the number of the rows is more than one; three multi-channel pipe groups 10 which are continuous in the arrangement direction D of the multi-channel pipe groups 10 are selected to act as a group module GM, and the number of the multi-channel pipe groups 10 at each side of the group module GM is an integer times of two; every two multi-channel pipe groups 10 at each side of the group module GM form one multi-channel pipe group pair GP, each multi-channel pipe group 10 has at least one multi-channel pipe 100 which makes the fluid have the same flow direction in each multi-channel pipe group 10. The first fluid collector 11 have ports 110 corresponding to the plurality of multi-channel pipe groups 10, when the flow directions of the fluid of the plurality of multi-channel pipe groups 10 at the ports 110 in the arrangement direction D of the multi-channel pipe groups 10 are opposite, the first partitioning plate 18 inserted in the first fluid collector 11 is configured to block communication of two adjacent multi-channel pipe groups 10 which have the opposite flow directions. Middle one multi-channel pipe group 10 of the three multi-channel pipe groups 10 of the group module GM is used for inflow or outflow of the fluid and the other two multi-channel pipe groups 10 of the group module GM are used for outflow or inflow of the fluid, so the other two multi-channel pipe groups 10 and the shared middle one multi-channel pipe group 10 of the group module GM form two fluid circuits. When the multi-channel pipe group pairs GP are provided at the side of the group module GM, the cooling mechanism 1 of the battery module heat management assembly further includes second partitioning plates 19 inserted in the second fluid collector 12, blocking communication of the group module GM and the adjacent multi-channel pipe group 10 in the second fluid collector 12 and blocking communication of two adjacent multi-channel pipe group pairs GP in the second fluid collector 12, and the two multi-channel pipe groups 10 of each multi-channel pipe group pair GP form one fluid circuit. The fluid inflow pipeline 16 includes a fluid inflow branch pipe 161, one end of the fluid inflow branch pipe 161 is communicated with each part of the first fluid collector 11 which is partitioned by the first partitioning plate 18 and used for inflow of the fluid. The fluid outflow pipeline 17 includes a fluid outflow branch pipe 171, one end of the fluid outflow branch pipe 171 is communicated with each part of the first fluid collector 11 which is partitioned by the first partitioning plate 18 and used for outflow of the fluid. When the fluid inflow branch pipe 161 is provided as one in number, the other end of the fluid inflow branch pipe 161 is fixed to the flange 13 and communicated with the fluid inflow joint 14. When the fluid inflow branch pipe 161 is provided as more than one in number, the fluid inflow pipeline 16 further includes: a fluid inflow main pipe 162, one end of the fluid inflow main pipe 162 is fixed to the flange 13 and communicated with the fluid inflow joint 14; and a multi-way inflow pipe 163 communicating the other end of the fluid inflow main pipe 162 and the other ends of all the fluid inflow branch pipes 161. When the fluid outflow branch pipe 171 is provided as one in number, the other end of the fluid outflow branch pipe 171 is fixed to the flange 13 and communicated with the fluid outflow joint 15. When the fluid outflow branch pipe 171 is provided as more than one in number, the fluid outflow pipeline 17 further includes: a fluid outflow main pipe 172, one end of the fluid outflow main pipe 172 is fixed to the flange 13 and communicated with the fluid outflow joint 15; and a multi-way outflow pipe 173 communicating the other end of the fluid outflow main pipe 172 and the other ends of all the fluid outflow branch pipe 171.

Figure 5:
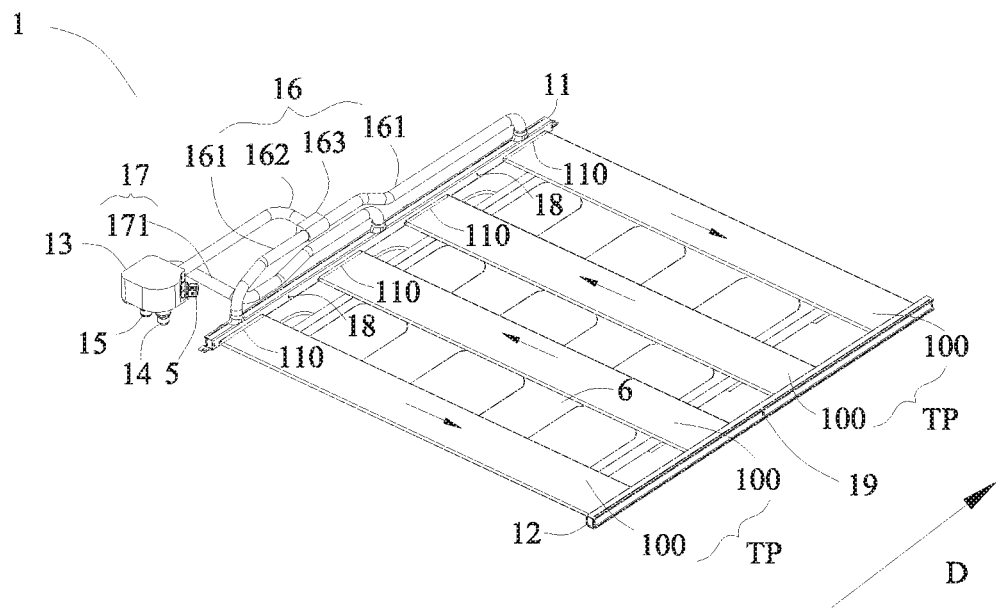
FIG. 5 is a perspective view of a cooling mechanism of the battery module heat management assembly according to the present disclosure, in which the number of multi-channel pipes is even.

In an embodiment of the battery module heat management assembly according to the present disclosure, referring to FIG. 5, the battery modules B of the battery pack are arranged in one row; the multi-channel pipe group 10 is provided as one in number, and the one multi-channel pipe group 10 has an even number of multi-channel pipes 100; every two multi-channel pipes 100 in an arrangement direction D of the multi-channel pipes 100 form one multi-channel pipe pair TP. The first fluid collector 1 have ports 110 corresponding to the multi-channel pipes 100, when the flow directions of the fluid of the multi-channel pipes 100 at the ports 110 in the arrangement direction D of the multi-channel pipes 100 are opposite, the first partitioning plate 18 inserted in the first fluid collector 11 is configured to block communication of two adjacent multi-channel pipes 100 which have the opposite flow directions. The cooling mechanism 1 of the battery module heat management assembly further includes second partitioning plates 19 inserted in the second fluid collector 12 and blocking communication of every two adjacent multi-channel pipe pairs TP in the second fluid collector 12, and the two multi-channel pipes 100 of each multi-channel pipe pair TP form one fluid circuit. The fluid inflow pipeline 16 includes a fluid inflow branch pipe 161, one end of the fluid inflow branch pipe 161 is communicated with each part of the first fluid collector 11 which is partitioned by the first partitioning plate 18 and used for inflow of the fluid. The fluid outflow pipeline 17 includes a fluid outflow branch pipe 171, one end of the fluid outflow branch pipe 171 is communicated with each part of the first fluid collector 11 which is partitioned by the first partitioning plate 18 and used for outflow of the fluid. When the fluid inflow branch pipe 161 is provided as one in number, the other end of the fluid inflow branch pipe 161 is fixed to the flange 13 and communicated with the fluid inflow joint 14. When the fluid inflow branch pipe 161 is provided as more than one in number, the fluid inflow pipeline 16 further includes: a fluid inflow main pipe 162, one end of the fluid inflow main pipe 162 is fixed to the flange 13 and communicated with the fluid inflow joint 14; and a multi-way inflow pipe 163 communicating the other end of the fluid inflow main pipe 162 and the other ends of all the fluid inflow branch pipes 161. When the fluid outflow branch pipe 171 is provided as one in number, the other end of the fluid outflow branch pipe 171 is fixed to the flange 13 and communicated with the fluid outflow joint 15. When the fluid outflow branch pipe 171 is provided as more than one in number, the fluid outflow pipeline 17 further includes: a fluid outflow main pipe 172, one end of the fluid outflow main pipe 172 is fixed to the flange 13 and communicated with the fluid outflow joint 15; and a multi-way outflow pipe 173 communicating the other end of the fluid outflow main pipe 172 and the other ends of all the fluid outflow branch pipes 171.

Figure 6:
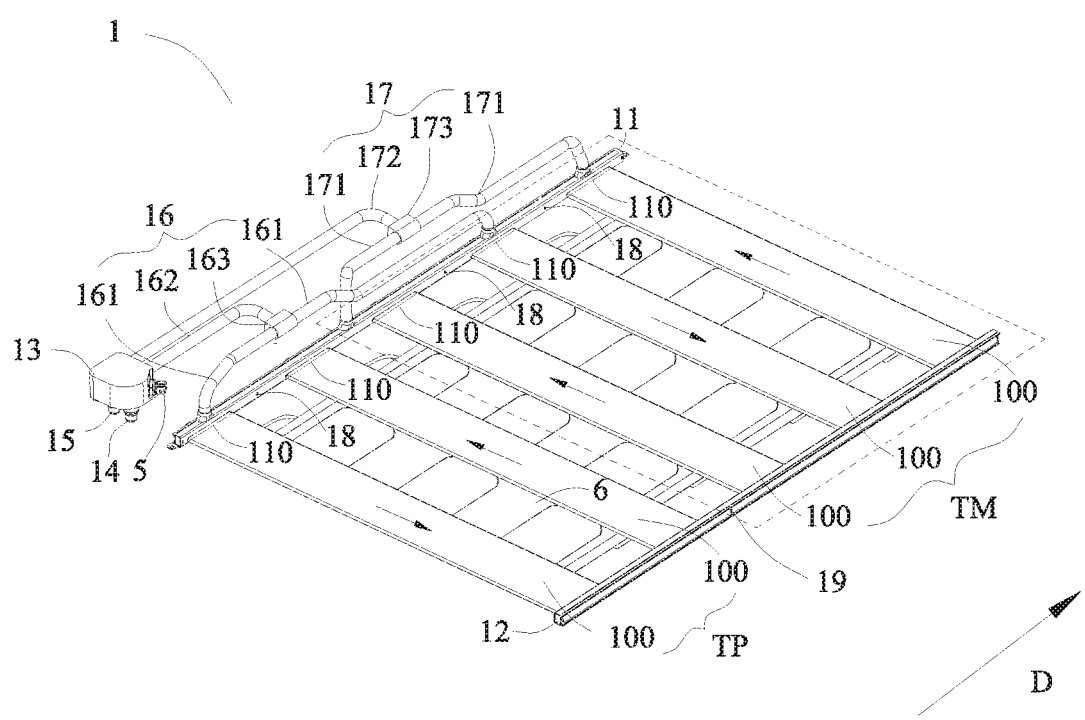
FIG. 6 is a perspective view of a cooling mechanism of the battery module heat management assembly according to the present disclosure, in which the number of multi-channel pipes is odd.

In an embodiment of the battery module heat management assembly according to the present disclosure, referring to FIG. 6, the battery modules B of the battery pack are arranged in one row; the multi-channel pipe group 10 is provided as one in number, and the one multi-channel pipe group 10 has a multi-channel pipe 100 provided as odd number which is more than one in number; three multi-channel pipes 100 which are continuous in the arrangement direction D of the multi-channel pipes 100 are selected to act as a pipe module TM, and the number of the multi-channel pipes 100 at each side of the pipe module TM is an integer times of two, every two multi-channel pipes 100 at each side of the pipe module TM form one multi-channel pipe pair TP. The first fluid collector 11 have ports 110 corresponding to the multi-channel pipes 100, when the flow directions of the fluid of the multi-channel pipes 100 at the ports 110 in the arrangement direction D of the multi-channel pipes 100 are opposite, the first partitioning plate 18 inserted in the first fluid collector 11 is configured to block communication of two adjacent the multi-channel pipes 100 which have the opposite flow directions. Middle one multi-channel pipe 100 of the three multi-channel pipes 100 of the pipe module TM is used for inflow or outflow of the fluid and the other two multi-channel pipes 100 of the pipe module TM are used for outflow or inflow of the fluid, so the other two multi-channel pipes 100 and the shared middle one multi-channel pipe 100 of the pipe module TM form two fluid circuits. When the multi-channel pipe pairs TP are provided at the side of the pipe module TM, the cooling mechanism 1 of the battery module heat management assembly further includes second partitioning plates 19 inserted in the second fluid collector 12, blocking communication of the pipe module TM and the adjacent multi-channel pipe pair TP in the second fluid collector 12 and blocking communication of two adjacent multi-channel pipe pairs TP in the second fluid collector 12, and the multi-channel pipe groups 10 of each multi-channel pipe group pair GP form one fluid circuit. The fluid inflow pipeline 16 includes a fluid inflow branch pipe 161, one end of the fluid inflow branch pipe 161 is communicated with each part of the first fluid collector 11 which is partitioned by the first partitioning plate 18 and used for inflow of the fluid. The fluid outflow pipeline 17 includes a fluid outflow branch pipe 171, one end of the fluid outflow branch pipe 171 is communicated with each part of the first fluid collector 11 which is partitioned by the first partitioning plate 18 and used for outflow of the fluid. When the fluid inflow branch pipe 161 is provided as one in number, the other end of the fluid inflow branch pipe 161 is fixed to the flange 13 and communicated with the fluid inflow joint 14. When the fluid inflow branch pipe 161 is provided as more than one in number, the fluid inflow pipeline 16 further includes: a fluid inflow main pipe 162, one end of the fluid inflow main pipe 162 is fixed to the flange 13 and communicated with the fluid inflow joint 14; and a multi-way inflow pipe 163 communicating the other end of the fluid inflow main pipe 162 and the other ends of all the fluid inflow branch pipes 161. When the fluid outflow branch pipe 171 is provided as one in number, the other end of the fluid outflow branch pipe 171 is fixed to the flange 13 and communicated with the fluid outflow joint 15. When the fluid outflow branch pipe 171 is provided as more than one in number, the fluid outflow pipeline 17 further includes: a fluid outflow main pipe 172, one end of the fluid outflow main pipe 172 is fixed to the flange 13 and communicated with the fluid outflow joint 15; and a multi-way outflow pipe 173 communicating the other end of the fluid outflow main pipe 172 and the other ends of all the fluid outflow branch pipes 171.

Figure 2:
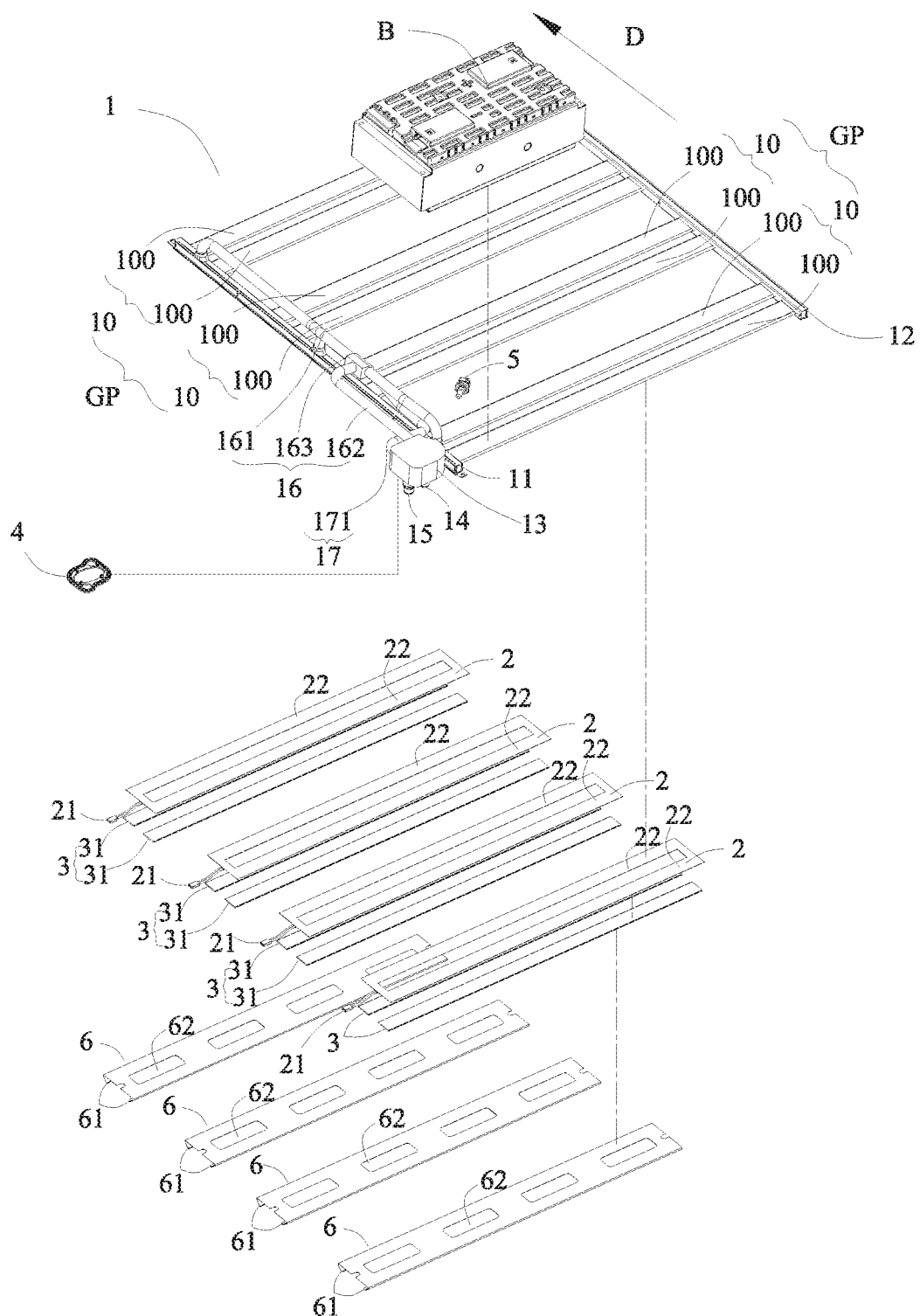
FIG. 2 is an exploded view of the battery module heat management assembly according to the present disclosure.

In an embodiment of the battery module heat management assembly according to the present disclosure, referring to FIG. 2, the battery module heat management assembly further includes a sealing gasket 4 fixed to a bottom of the flange 13, so the flange 13 is provided to the battery pack box in a sealing mode, the battery pack box receives the rows of battery modules B. The sealing gasket 4 ensures a requirement for sealing level between the heat management assembly and the battery pack box.

In an embodiment of the battery module heat management assembly according to the present disclosure, referring to FIG. 2, the battery module heat management assembly may further include a temperature sensor 5 fixed to the flange 13 and communicating with a battery management system. The temperature sensor 5 may be fixed to the flange 13 by a threaded connection with a sealing gasket. The temperature sensor 5 may communicate with the battery management system via a low-voltage wire. The battery management system may detect temperatures of the cooling fluid at an inflow position and an outflow position by the temperature sensor 5 for implementing strategy and fault diagnosis of heat management.

In the battery module heat management assembly according to the present disclosure, a thickness of each heating film 2 may range from 1 mm to 3 mm. An area of the heating film may be determined based on a sum of heating power required by the battery module(s) in each row.

In an embodiment of the battery module heat management assembly according to the present disclosure, referring to FIG. 1 and FIG. 2, an end of each heating film 2 adjacent to the first fluid collector 11 may be provided with a pluggable member 21 for plugging with a high voltage circuit to allow the heating films 2 to be connected with the high voltage circuit in parallel. The heating film 2 adopts an integral design concept to ensure the convenience and the maintainability of installation, decrease electrical connection as much as possible and reduce security risk, which is particularly important for a large battery pack with a large number of battery modules.

In an embodiment of the battery module heat management assembly according to the present disclosure, each heating film 2 includes a substrate with a positive temperature coefficient and two insulating films respectively attached on two opposite surfaces of the substrate. The substrate may be a composite material. The substrate may be made by printing. The insulating film may be made of high voltage insulation material. The substrate with the positive temperature coefficient has higher heating efficiency at a low temperature than at a high temperature, and may stabilize the temperature of the battery module at a set value (such as 10° C.) after heating for a certain time, which not only avoids the battery module being heated excessively but also effectively promotes energy utilization efficiency and energy allocation efficiency of the dynamical system.

In an embodiment of the battery module heat management assembly according to the present disclosure, each heating film 2 may be fixed between one corresponding multi-channel pipe group 10 and one corresponding heat insulating layer 3 via adhesives on two surfaces of each heating film 2.

In an embodiment of the battery module heat management assembly according to the present disclosure, referring to FIG. 2, each heating film 2 may have an extending portion 22 which is identical with the multi-channel pipe 100 of one corresponding multi-channel pipe group 10 in number and extends along an axial direction of the multi-channel pipe 100.

In an embodiment of the battery module heat management assembly according to the present disclosure, referring to FIG. 2, each heat insulating layer 3 may have a heat insulating sub-layer 31 which is identical with the extending portion 22 of one corresponding heating film 2 in number.

In the battery module heat management assembly according to the present disclosure, each heat insulating layer 3 may be heat resisting plastic or heat resisting rubber.

In an embodiment of the battery module heat management assembly according to the present disclosure, referring to FIG. 2 and FIG. 7, the battery module heat management assembly may further include a plurality of supporting structures 6, each supporting structure 6 is provided below one corresponding heat insulating layer 3. The supporting structure 6 is made of elastic material, the elastic material may be metal material, and the metal material may be stainless steel. The supporting structure 6 provides long-term, effective and stable supporting force under a compressed space state formed after the battery modules and the battery pack box are assembled, thereby improving the heat exchange performance between the power battery modules and the heat management unit. The supporting structure 6 is different from some past solutions using foam as support, and solves the aging problem and the attenuation problem of working life which exist in the foam and are caused by long-term alternate loading, ensures that the supporting force are stabilized at a set range for long term, and also meets the requirement of durability, stabilization, low cost and light weight.

Figure 7:
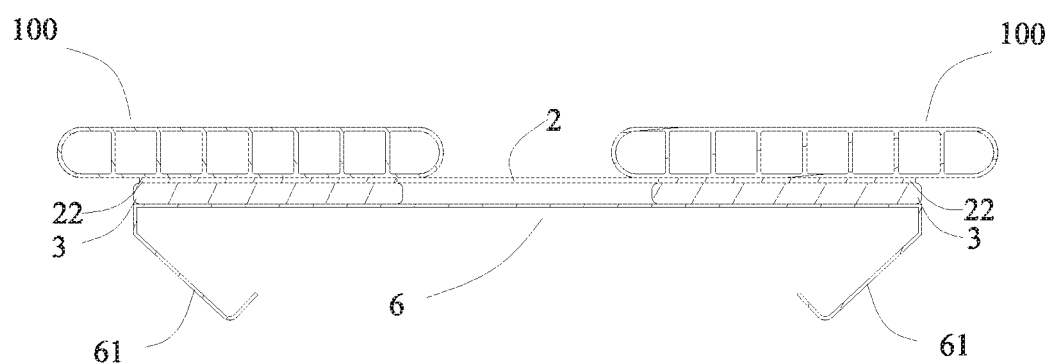
FIG. 7 is a cross-sectional view taken along line A-A of FIG. 3.

In an embodiment of the battery module heat management assembly according to the present disclosure, referring to FIG. 2 and FIG. 7, each supporting structure 6 may have bending leg portions 61.

In an embodiment of the battery module heat management assembly according to the present disclosure, referring to FIG. 2 and FIG. 7, each supporting structure 6 may have a plurality of opening portions 62.

In the battery module heat management assembly according to the present disclosure, the battery module B may be a power battery module B.

In the battery module heat management assembly according to the present disclosure, the cooling fluid may be liquid or gas. The liquid may be a mixture of water and ethylene glycol.

The present disclosure further provides a battery pack. The battery pack in accordance with some embodiments includes: a battery module; a battery pack box configured to receive the battery module; and a battery module heat management assembly including a cooling mechanism 1. The cooling mechanism 1 includes: a plurality of multi-channel pipes 100 configured to be provided at a bottom of the battery module; a first fluid collector 11 and a second fluid collector 12 configured to be communicated with an external cooling fluid circuit, two ends of each multi-channel pipe 100 are respectively communicated with the first fluid collector 11 and the second fluid collector 12.

The present disclosure further provides a vehicle. The vehicle includes the battery pack.

What is claimed is:

1. A battery module heat management assembly, comprising a cooling mechanism, the cooling mechanism comprising:
   a plurality of multi-channel pipes configured to be provided at a bottom of a battery module;
   a first fluid collector and a second fluid collector configured to be communicated with an external cooling fluid circuit, two ends of each multi-channel pipe being respectively communicated with the first fluid collector and the second fluid collector;
   a fluid inflow pipeline communicated with the first fluid collector;
   a fluid outflow pipeline communicated with the first fluid collector; and
   at least one first partitioning plate inserted in the first fluid collector for blocking communication of the fluid inflow pipeline and the fluid outflow pipeline in the first fluid collector,
   at least one second partitioning plate inserted in the second fluid collector and configured to block communication of two adjacent multi-channel pipes in the second fluid collector.

2. The battery module heat management assembly according to claim 1, wherein the first partitioning plate is configured to block communication of two adjacent multi-channel pipes in the first fluid collector, and flow directions of cooling fluid in the two adjacent multi-channel pipes are opposite.

3. The battery module heat management assembly according to claim 1, wherein flow directions of cooling fluid in the two adjacent multi-channel pipes are same.

4. The battery module heat management assembly according to claim 1, wherein the cooling mechanism further comprises:
   a fluid inflow joint communicated with the fluid inflow pipeline for inflow of a cooling fluid supplied by the external cooling fluid circuit;
   a fluid outflow joint communicated with the fluid outflow pipeline for outflow of the cooling fluid.

5. The battery module heat management assembly according to claim 2, wherein the cooling mechanism further comprises a flange configured to be provided to a battery pack box which is configured to receive the battery module; the fluid inflow joint and the fluid outflow joint are provided to the flange, and the fluid inflow pipeline and the fluid outflow pipeline are fixed to the flange.

6. The battery module heat management assembly according to claim 5, wherein the cooling mechanism further comprises a temperature sensor fixed to the flange and configured to communicate with a battery management system.

7. The battery module heat management assembly according to claim 1, wherein the fluid inflow pipeline comprises fluid inflow branch pipes and a fluid inflow main pipe, one end of each fluid inflow branch pipe is communicated with the first fluid collector, and the other end of each fluid inflow branch pipe is communicated with the fluid inflow main pipe.

8. The battery module heat management assembly according to claim 1, wherein the fluid outflow pipeline comprises fluid outflow branch pipes and a fluid outflow main pipe, one end of each fluid outflow branch pipe is communicated with the first fluid collector, and the other end of each fluid outflow branch pipe is communicated with the fluid outflow main pipe.

9. The battery module heat management assembly according to claim 1, wherein the battery module heat management assembly further comprises a heating film provided below the multi-channel pipe and configured to heat the multi-channel pipe.

10. The battery module heat management assembly according to claim 9, wherein an end of the heating film is provided with a pluggable member configured to plug with a high voltage circuit.

11. The battery module heat management assembly according to claim 9, wherein the heating film comprises a substrate with a positive temperature coefficient and two insulating films respectively attached on two opposite surfaces of the substrate.

12. The battery module heat management assembly according to claim 9, wherein the battery module heat management assembly further comprises a heat insulating layer provided below the heating film.

13. The battery module heat management assembly according to claim 12, wherein the heating film is fixed between the multi-channel pipe and the heat insulating layer via adhesive.

14. The battery module heat management assembly according to claim 1, wherein the battery module heat management assembly further comprises a supporting structure provided below the multi-channel pipe.

15. The battery module heat management assembly according to claim 14, wherein the supporting structure is made of elastic material.

16. The battery module heat management assembly according to claim 14, wherein the supporting structure has a bending leg portion.

17. The battery module heat management assembly according to claim 14, wherein the supporting structure has an opening portion.

18. A battery pack, comprising:
a battery module;
a battery pack box configured to receive the battery module; and
a battery module heat management assembly comprising a cooling mechanism, the cooling mechanism comprising:
a plurality of multi-channel pipes configured to be provided at a bottom of the battery module;
a first fluid collector and a second fluid collector configured to be communicated with an external cooling fluid circuit, two ends of each multi-channel pipe being respectively communicated with the first fluid collector and the second fluid collector;
a fluid inflow pipeline communicated with the first fluid collector;
a fluid outflow pipeline communicated with the first fluid collector; and
at least one first partitioning plate inserted in the first fluid collector for blocking communication of the fluid inflow pipeline and the fluid outflow pipeline in the first fluid collector,
at least one second partitioning plate inserted in the second fluid collector and configured to block communication of two adjacent multi-channel pipes in the second fluid collector.

19. A vehicle, comprising a battery pack;
the battery pack comprising:
a battery module;
a battery pack box configured to receive the battery module; and
a battery module heat management assembly comprising a cooling mechanism, the cooling mechanism comprising:
a plurality of multi-channel pipes configured to be provided at a bottom of the battery module;
a first fluid collector and a second fluid collector configured to be communicated with an external cooling fluid circuit, two ends of each multi-channel pipe being respectively communicated with the first fluid collector and the second fluid collector;
a fluid inflow pipeline communicated with the first fluid collector;
a fluid outflow pipeline communicated with the first fluid collector; and
at least one first partitioning plate inserted in the first fluid collector for blocking communication of the fluid inflow pipeline and the fluid outflow pipeline in the first fluid collector,
at least one second partitioning plate inserted in the second fluid collector and configured to block communication of two adjacent multi-channel pipes in the second fluid collector.

\* \* \* \* \*